US012454199B2

(12) United States Patent
Surya

(10) Patent No.: US 12,454,199 B2
(45) Date of Patent: Oct. 28, 2025

(54) BATTERY CONDITIONING SYSTEM AND METHOD

(71) Applicant: Rivian IP Holdings, LLC, Irvine, CA (US)

(72) Inventor: Vivek Narsimhan Surya, Irvine, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/904,971

(22) Filed: Oct. 2, 2024

(65) Prior Publication Data

US 2025/0108728 A1  Apr. 3, 2025

Related U.S. Application Data

(60) Provisional application No. 63/587,424, filed on Oct. 2, 2023.

(51) Int. Cl.
*B60L 58/27* (2019.01)
(52) U.S. Cl.
CPC ......... *B60L 58/27* (2019.02); *B60L 2240/545* (2013.01); *B60L 2240/662* (2013.01); *B60L 2250/14* (2013.01); *B60L 2260/56* (2013.01)

(58) Field of Classification Search
CPC ............... B60L 58/27; B60L 2240/545; B60L 2240/662; B60L 2250/14; B60L 2260/56; H01M 2010/4271; H01M 10/48; H01M 10/625; H01M 10/63
See application file for complete search history.

(56) References Cited

U.S. PATENT DOCUMENTS

2017/0267116 A1\* 9/2017 Lindemann ............. B60L 53/66
2018/0304765 A1\* 10/2018 Newman ................. B60L 58/26

\* cited by examiner

*Primary Examiner* — Adam A Arciero
(74) *Attorney, Agent, or Firm* — Patterson + Sheridan, LLP

(57) ABSTRACT

A battery electric vehicle includes a scheduler configured to invoke conditioning of a battery preceding a time specified by a user. The scheduler instructs a VDM ECU to output a current requirement to drive motors according to a selected drive mode of a vehicle. A BMS ECU receives the current requirement and outputs a temperature requirement required to achieve the current requirement according to a composition of the battery. The BMS ECU outputs the temperature requirement to a TMM, which manages heating of the battery to achieve the temperature requirement. The time at which a vehicle is waked to begin conditioning the battery may be based on whether the vehicle is charging and a current or expected ambient temperature.

10 Claims, 8 Drawing Sheets

BATTERY CONDITIONING SYSTEM AND METHOD

RELATED APPLICATION

This application claims the benefit of U.S. Application Ser. No. 63/587,424 filed Oct. 2, 2023 and entitled BATTERY CONDITIONING SYSTEM AND METHOD.

INTRODUCTION

The present disclosure relates to conditioning a battery of a battery electric vehicle (BEV).

SUMMARY

The present disclosure describes an approach for performing scheduled conditioning of a battery of a BEV. In one aspect a vehicle includes a chassis, one or more motors mounted to the chassis, and a battery mounted to the chassis. A control system is mounted to the chassis and is configured to: receive a ready time at which the battery should be within a range of acceptable temperatures; (a) evaluate, whether the battery is connected to a source of electrical power; (b) if the battery is connected to the source of electrical power, selecting a first wake-up time at which to begin conditioning of the battery to within the range of acceptable temperatures, the first wake-up time preceding the ready time by a battery conditioning time; and (c) if the battery is not connected to the source of electrical power, selecting a second wake-up time at which to begin conditioning of the battery to within the range of acceptable temperatures, the second wake-up time preceding the ready time by a cabin conditioning time that is less than the battery conditioning time, the cabin conditioning time being an estimated time to condition a cabin of the vehicle to a target temperature.

In another aspect, a vehicle includes a chassis having one or more motors mounted and a battery mounted to the chassis. The vehicle further includes a first electronic component configured to control a supply of current to the one or more motors responsive to inputs from a driver and a second electronic component configured to manage a flow of current into and out of the battery. The vehicle further includes a scheduling component configured to invoke conditioning of the battery in preparation for at least one of driving and charging by causing the first electronic component to provide a current requirement to the second electronic component, the second electronic component being configured to invoke conditioning of the battery in preparation for the current requirement according to a composition of the battery.

DETAILED DESCRIPTION

The available power output of a battery, such as a lithium-ion battery, is dependent on temperature. In cold temperatures, the battery of a battery electric vehicle (BEV) may be "conditioned," which is to say heated to a temperature at which the battery can more efficiently provide a desired amount of current to one or more motors of the BEV that drive the wheels of the BEV.

A BEV manufacturer may manufacture multiple vehicles and versions of vehicles that may have different batteries, motors, or other components. In particular, the chemical composition of batteries in different vehicles may be different, resulting in different conditioning requirements.

In the embodiments disclosed herein, components of a BEV are made agnostic to variation in drivetrain configuration and battery chemistry. A scheduler is configured by a user to condition the battery in preparation for driving. The scheduler invokes a first electronic component, such as a vehicle dynamics module (VDM) electronic control unit (ECU), to output the amount of current required by the one or more motors of the drivetrain of the BEV for a current drive mode of the BEV. The current requirement is provided to a second electronic component, such as a battery management system ECU (BMS ECU). The BMS ECU manages the charging and discharging of the battery and determines a temperature requirement for the battery to achieve the current requirement. The temperature requirement is output by the BMS ECU to a third electronic component, such as a thermal management module ECU (TMM ECU). The TMM ECU manages the circulation of fluid for cooling or heating the battery and heats the fluid in order to achieve the temperature requirement. In this manner, the scheduler, VDM ECU, and TMM ECU may be agnostic to battery chemistry. Likewise, the scheduler, BMS ECU, and TMM ECU may be agnostic to the configuration of the drivetrain.

Figure 1A:
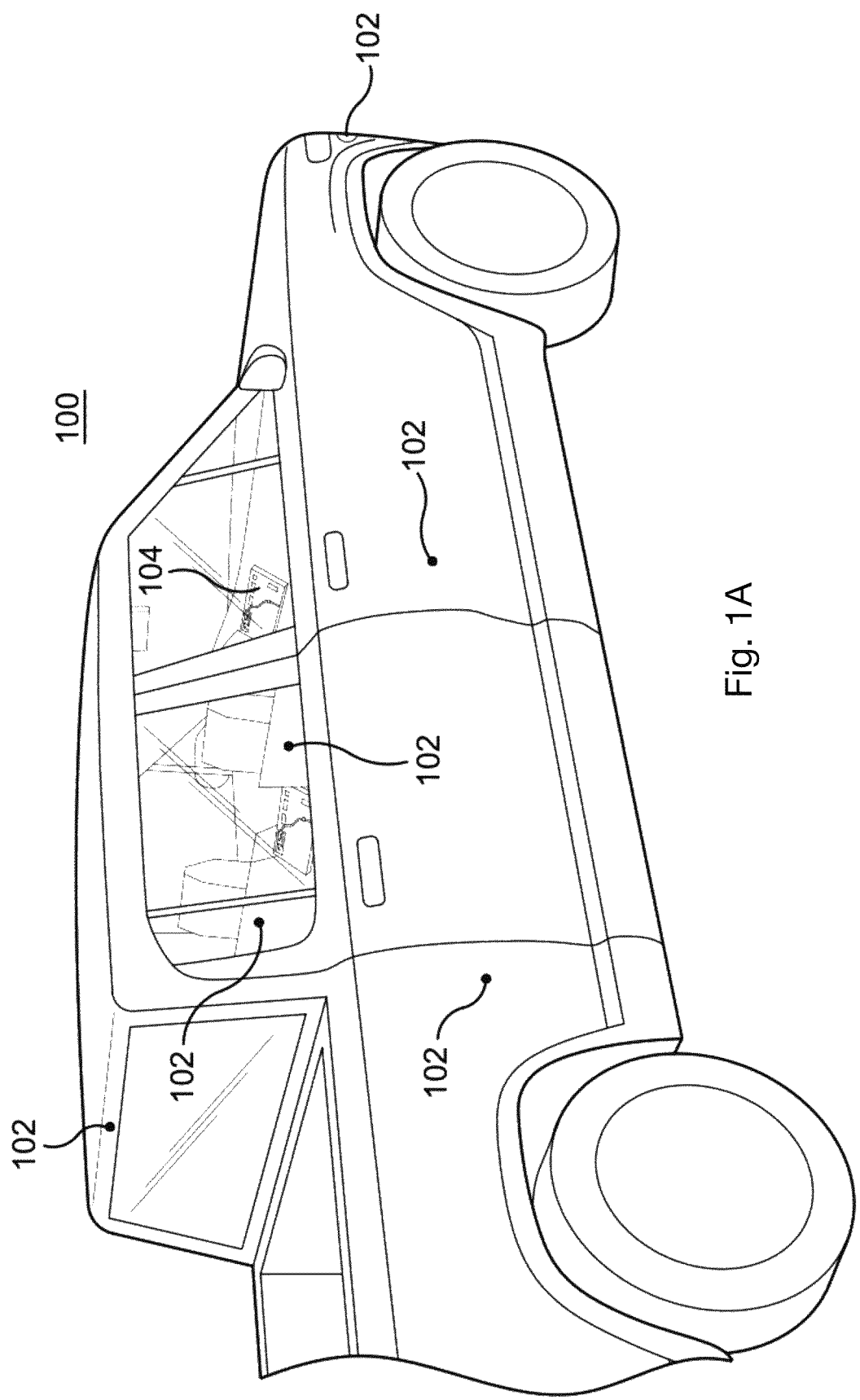
FIG. 1A illustrates an example vehicle having a battery that may be conditioned in accordance with certain embodiments.

FIG. 1A illustrates an example vehicle 100. As seen in FIG. 1A, the vehicle 100 has multiple exterior cameras 102 and one or more front displays 104. Each of these exterior cameras 102 may capture a particular view or perspective on the outside of the vehicle 100. The images or videos captured by the exterior cameras 102 may then be presented on one or more displays in the vehicle 100, such as the one or more front displays 104, for viewing by a driver.

Figure 1B:
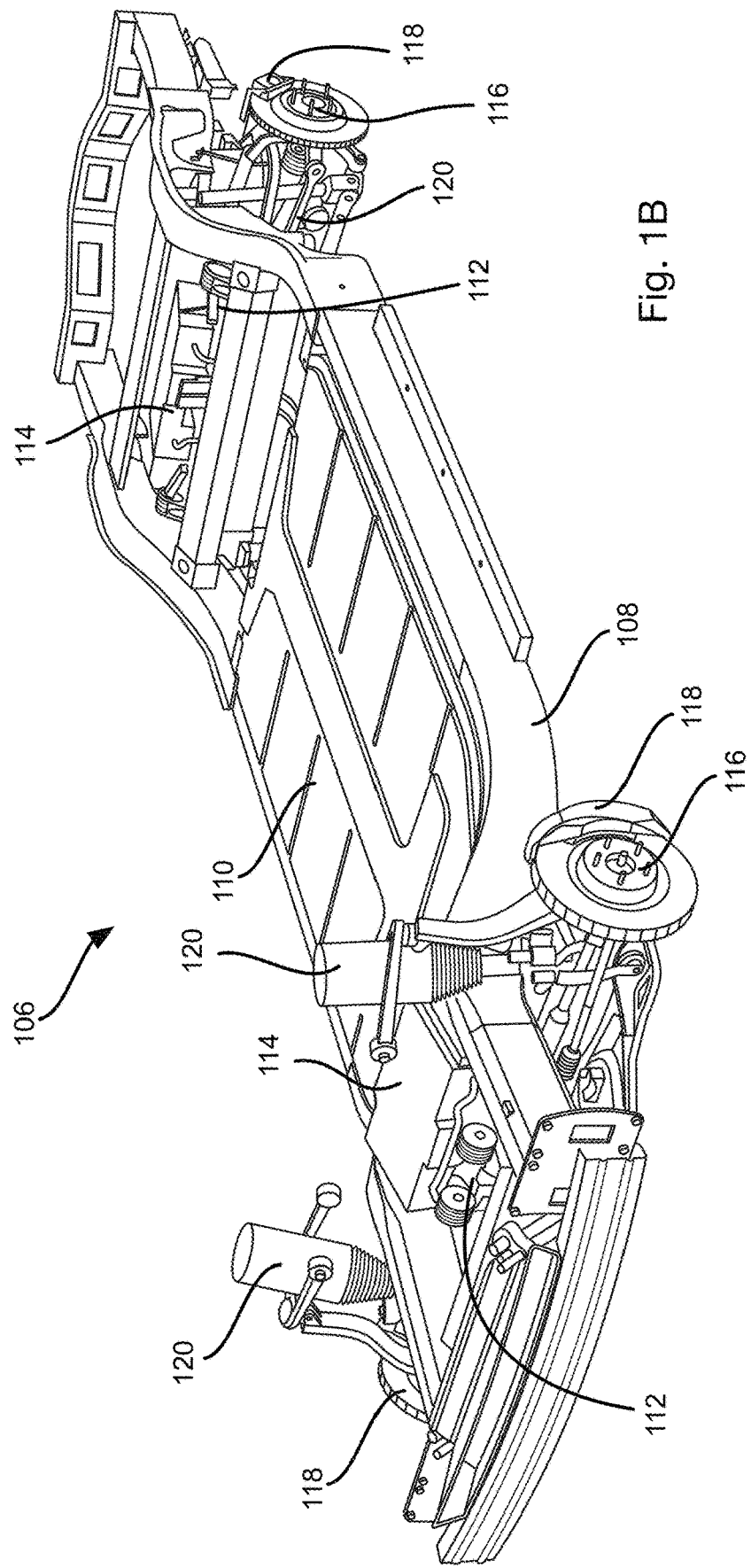
FIG. 1B illustrates a chassis of a vehicle having a battery that may be conditioned in accordance with certain embodiments.

Referring to FIG. 1B, the vehicle 100 may include a chassis 106 including a frame 108 providing a primary structural member of the vehicle 100. The frame 108 may be formed of one or more beams or other structural members or may be integrated with the body of the vehicle (i.e., unibody construction).

In embodiments where the vehicle 100 is a battery electric vehicle (BEV) or possibly a hybrid vehicle, a large battery 110 is mounted to the chassis 106 and may occupy a substantial (e.g., at least 80 percent) of an area within the frame 108. For example, the battery 110 may store from 100 to 200 kilowatt hours (kWh). The battery 110 may be a lithium-ion battery or other type of rechargeable battery. The battery may be substantially planar in shape.

Power from the battery 110 may be supplied to one or more drive units 112. Each drive unit 112 may be formed of an electric motor and possibly a gear reduction drive. In some embodiments, there is a single drive unit 112 driving either the front wheels or the rear wheels of the vehicle 100. In another embodiment, there are two drive units 112, each driving either the front wheels or the rear wheels of the vehicle 100. In yet another embodiment, there are four drive units 112, each drive unit 112 driving one of four wheels of the vehicle 100.

Power from the battery 110 may be supplied to the drive units 112 by one or more sets of power electronics 114. The power electronics 114 may include inverters configured to convert direct current (DC) from the battery 110 into alternating current (AC) supplied to the motors of the drive units 112.

The drive units 112 are coupled to two or more hubs 116 to which wheels may mount. Each hub 116 includes a corresponding brake 118, such as the illustrated disc brakes. The drive units 112 or other component may also provide regenerative braking. Each hub 116 is further coupled to the frame 108 by a suspension 120. The suspension 120 may include metal or pneumatic springs for absorbing impacts. The suspension 120 may be implemented as a pneumatic or hydraulic suspension capable of adjusting a ride height of the chassis 106 relative to a support surface. The suspension 120 may include a damper with the properties of the damper being either fixed or adjustable electronically.

In the embodiment of FIG. 1B and in the discussion below, the vehicle 100 is a battery electric vehicle. However, the systems and methods disclosed herein may be used for any type of vehicle, including vehicles powered by an internal combustion engine (ICE), hybrid drivetrain, hydrogen fuel cell drivetrain, or other type of drivetrain that requires heating in preparation for use, such as diesel engines.

Figure 2A:
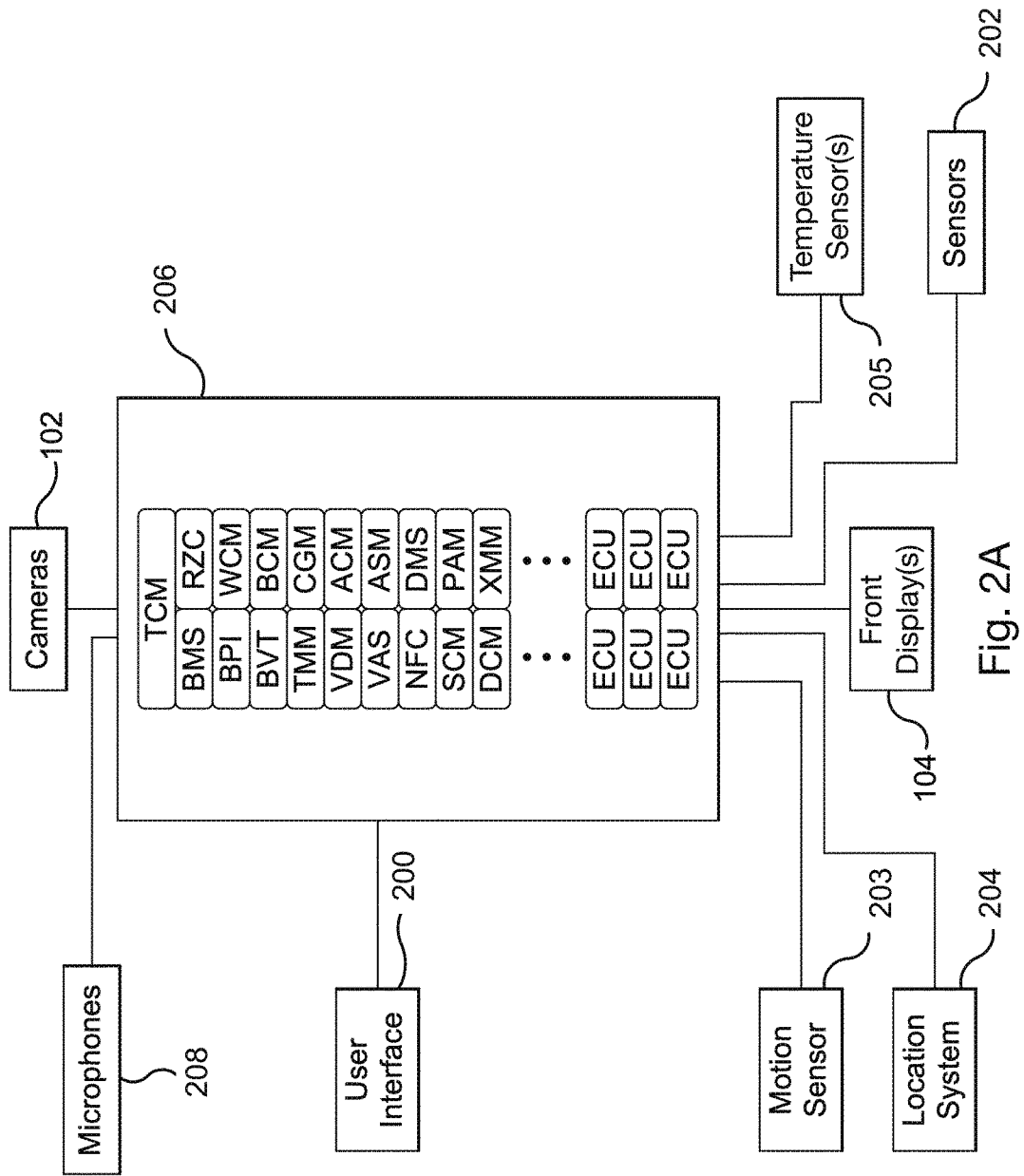
FIG. 2A is a schematic block diagram of components for implementing battery conditioning in accordance with certain embodiments.

FIG. 2A illustrates example components of the vehicle 100 of FIG. 1A. As shown in FIG. 2A, the vehicle 100 includes the cameras 102, the one or more front displays 104, a user interface 200, one or more sensors 202, a motion sensor 203, and a location system 204. The one or more sensors 202 may include ultrasonic sensors, radio detection and ranging (RADAR) sensors, light detection and ranging (LIDAR) sensors, or other types of sensors. The location system 204 may be implemented as a global positioning system (GPS) receiver. The user interface 200 allows a user, such as a driver or passenger in the vehicle 100, to provide input.

The components of the vehicle 100 may include one or more temperature sensors 205. The temperature sensors 205 may include sensors configured to sense an ambient air temperature, temperature of the battery 110, temperature of power electronics 114, temperature of each drive unit 112 and/or each motor of each drive unit 112, or the temperature of any other component of the vehicle 100.

Figure 4:
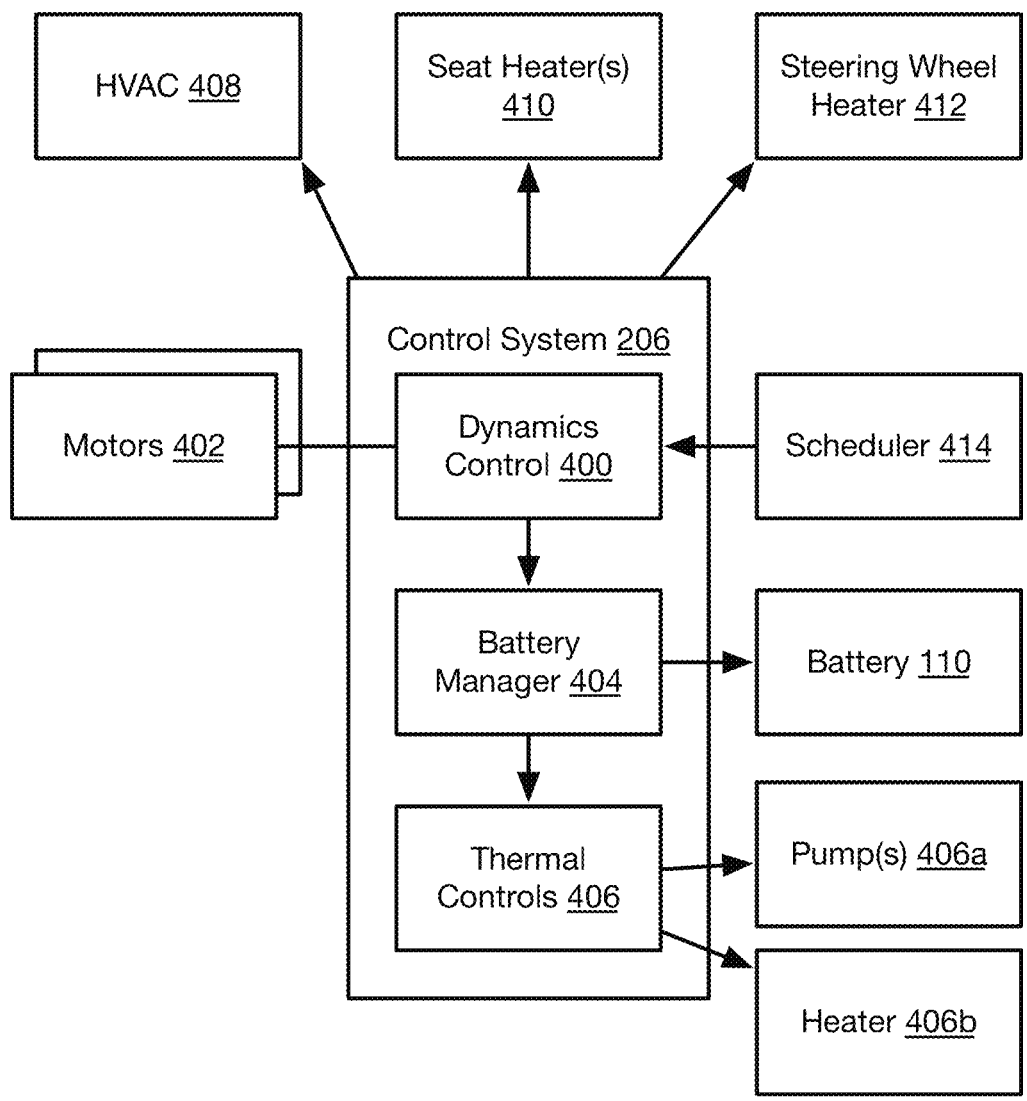
FIG. 4 illustrates components that may be used to condition a battery in accordance with certain embodiments.
Figure 5:
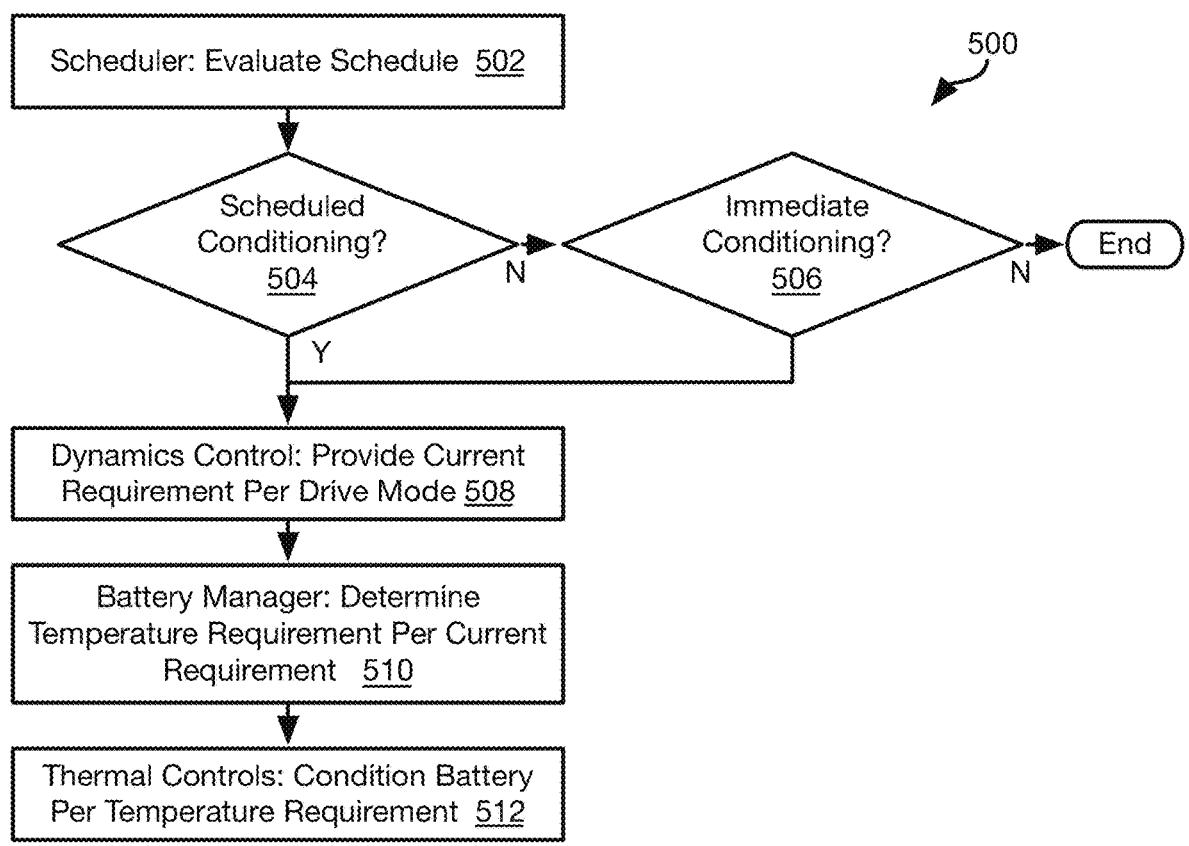
FIG. 5 illustrates a method for performing conditioning of a battery in accordance with certain embodiments.

A control system 206 executes instructions to perform at least some of the actions or functions of the vehicle 100, including the functions described in relation to FIGS. 4 and 5. For example, as shown in FIG. 2, the control system 206 may include one or more electronic control units (ECUs) configured to perform at least some of the actions or functions of the vehicle 100, including the functions described in relation to FIGS. 4 and 5. In certain embodiments, each of the ECUs is dedicated to a specific set of functions. Each ECU may be a computer system and each ECU may include functionality described below in relation to FIGS. FIGS. 4 and 5.

Certain features of the embodiments described herein may be controlled by a Telematics Control Module (TCM) ECU. The TCM ECU may provide a wireless vehicle communication gateway to support functionality such as, by way of example and not limitation, over-the-air (OTA) software updates, communication between the vehicle and the internet, communication between the vehicle and a computing device, in-vehicle navigation, vehicle-to-vehicle communication, communication between the vehicle and landscape features (e.g., automated toll road sensors, automated toll gates, power dispensers at charging stations), or automated calling functionality.

Certain features of the embodiments described herein may be controlled by a Central Gateway Module (CGM) ECU. The CGM ECU may serve as the vehicle's communications hub that connects and transfer data to and from the various ECUs, sensors, cameras, microphones, motors, displays, and other vehicle components. The CGM ECU may include a network switch that provides connectivity through Controller Area Network (CAN) ports, Local Interconnect Network (LIN) ports, and Ethernet ports. The CGM ECU may also serve as the master control over the different vehicle modes (e.g., road driving mode, parked mode, off-roading mode, tow mode, camping mode), and thereby control certain vehicle components related to placing the vehicle in one of the vehicle modes.

In various embodiments, the CGM ECU collects sensor signals from one or more sensors of vehicle 100. For example, the CGM ECU may collect data from cameras 102 and sensors 202. The sensor signals collected by the CGM ECU are then communicated to the appropriate ECUs for performing, for example, the operations and functions described in relation to FIGS. 4 and 5.

The control system 206 may also include one or more additional ECUs, such as, by way of example and not limitation: a Vehicle Dynamics Module (VDM) ECU, an Experience Management Module (XMM) ECU, a Vehicle Access System (VAS) ECU, a Near-Field Communication (NFC) ECU, a Body Control Module (BCM) ECU, a Seat Control Module (SCM) ECU, a Door Control Module (DCM) ECU, a Rear Zone Control (RZC) ECU, an Autonomy Control Module (ACM) ECU, an Autonomous Safety Module (ASM) ECU, a Driver Monitoring System (DMS) ECU, and/or a Winch Control Module (WCM) ECU. If vehicle 100 is an electric vehicle, one or more ECUs may provide functionality related to the battery pack of the vehicle, such as a Battery Management System (BMS) ECU, a Battery Power Isolation (BPI) ECU, a Balancing Voltage Temperature (BVT) ECU, and/or a thermal Management Module (TMM) ECU. In various embodiments, the XMM ECU transmits data to the TCM ECU (e.g., via Ethernet, etc.). Additionally or alternatively, the XMM ECU may transmit other data (e.g., sound data from microphones 208, etc.) to the TCM ECU.

Figure 2B:
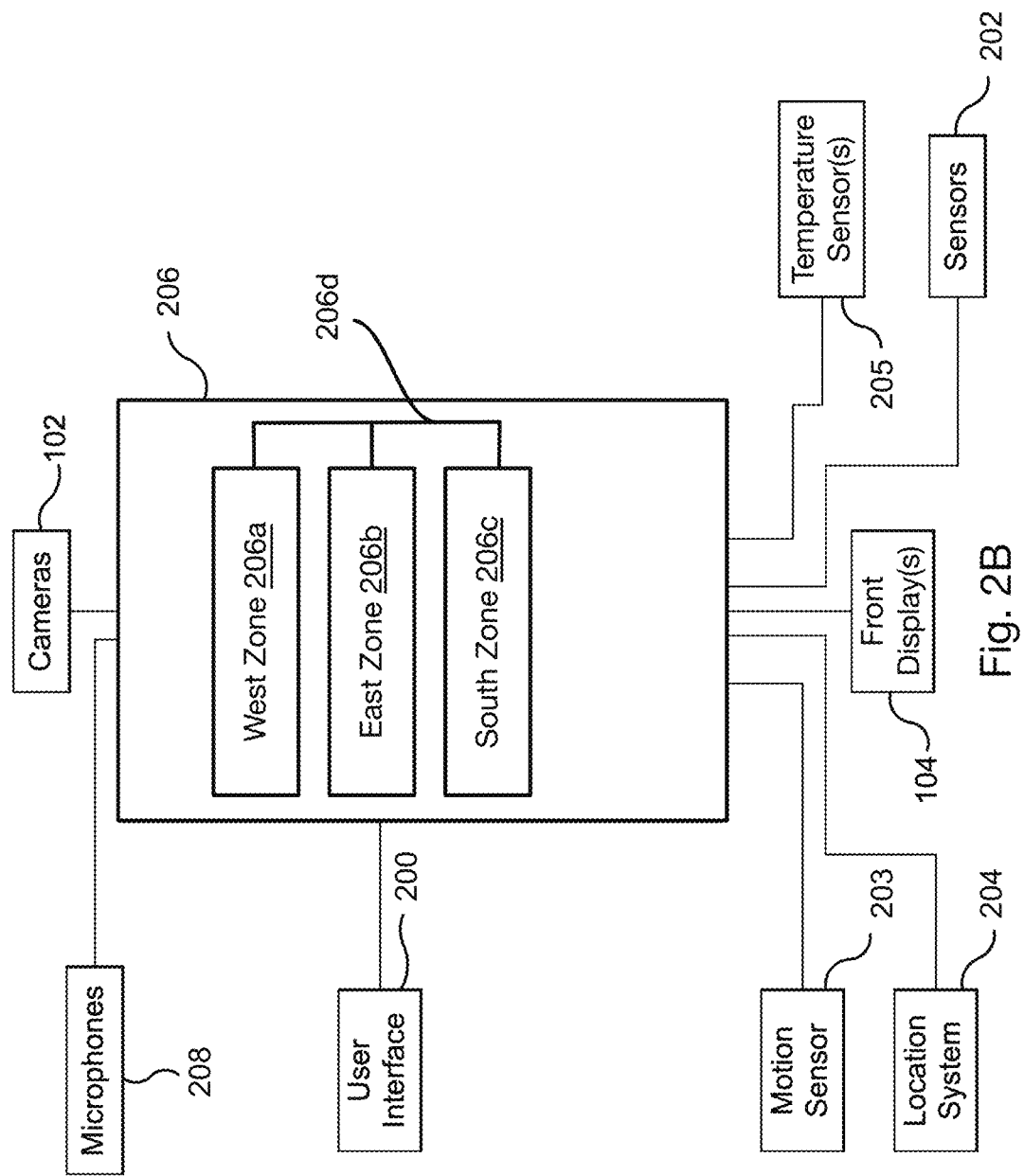
FIG. 2B is a schematic block diagram of alternative components for implementing battery conditioning in accordance with certain embodiments.

Referring to FIG. 2B, in some embodiments, the control system 206 may be implemented as a plurality of zonal controllers 206a, 206b, 206c. Each zonal controller 206a, 206b, 206c may control a subset of systems of the vehicle. The subset of systems controlled by each zonal controller 206a, 206b, 206c may be generally assigned based on location within the vehicle 100. For example, a west zonal controller 206a may control systems on a driver side of the vehicle 100, an east zonal controller 206b may control systems on a passenger side of the vehicle 100, and a south zonal controller 206c may control systems in a rear portion of the vehicle. Each zonal controller 206a, 206b, 206c may implement a portion of the functions ascribed to the ECUs of the control system 206 of FIG. 2A. The functions of the ECUs may be distributed among the zonal controller 206a, 206b, 206c such that only one zonal controller 206a, 206b, 206c implements the functions of each ECU. Alternatively, the functions of an ECU may be duplicated across multiple zonal controllers 206a, 206b, 206c, each zonal performing the functions of the ECU for the portion of the vehicle to which that zonal controller 206a, 206b, 206c is assigned.

The zonal controllers 206a, 206b, 206c may be connected to one another by a network 206d, such as an Ethernet network, controller area network (CAN), or other type of network.

Figure 3:
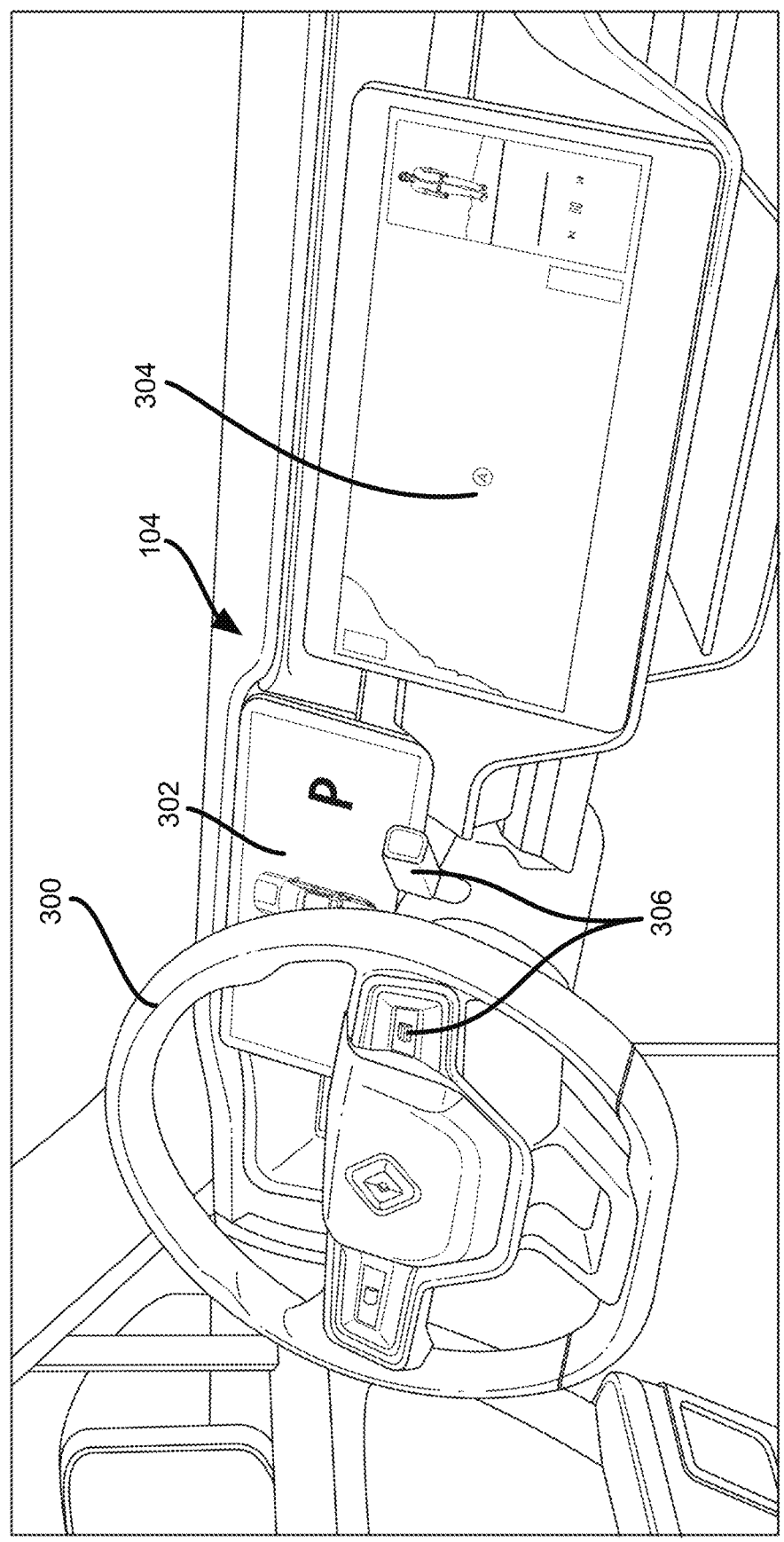
FIG. 3 illustrates display devices that may be used to provide interfaces for scheduling battery conditioning in accordance with certain embodiments.

Referring to FIG. 3, the interior of the vehicle 100 includes a steering wheel 300 that is turned by the user to invoke turning of the vehicle 100 by some or all of changing the angle of the front wheels, changing the angle of the rear wheels, and changing the relative speeds of wheels on the right and left sides of the vehicle. The interior of the vehicle 100 includes a dashboard, which in the illustrated embodiment includes, or is implemented as, a dashboard display device 302 coupled to the control system 206. The control system 206 may display vehicle state information (speed, state of charge, drive-train state (drive, park, reverse)), navigation information (maps, directions, etc.) or other information.

The interior of the vehicle 100 may further include an infotainment display device 304. The infotainment display device 304 may be embodied as a touchscreen located to one side of the steering wheel 300. The control system 206 may therefore cause the infotainment display device 304 to display interfaces for controlling systems of the vehicle and receive and execute inputs received through the interfaces from a driver or passenger.

The steering wheel 300, steering column, center console, or other portion of the vehicle 100 may have driver controls 306 mounted thereto that are coupled to the control system 206 to provide inputs for controlling operation of the vehicle 100. For example, the driver controls 306 may be used to select a drive gear (forward, neutral, reverse), a drive mode as described herein or control other aspects of the operation of the vehicle 100. One or both of the dashboard display device 302 and infotainment display device 304 may be embodied as one or more touchscreens through which driver inputs may also be received.

Referring to FIG. 4, the control system 206 may implement a dynamics controller 400. The dynamics controller 400 may be implemented by the VDM ECU, some or all of the zonal controller 206a, 206b, 206c, or some other component. The dynamics controller 400 is configured to control driving characteristics of the vehicle 100 according to a drive mode specified by a user. A drive mode may be defined as including a collection of values for attributes of the dynamics controller 400 defined by default and/or by a user for that drive mode. The dynamics controller 400 will then electronically configure the vehicle 100 according to the values for the attributes in order to implement a given drive mode. Attributes that may be evaluated according to the approach described herein may include attributes relating to acceleration and regenerative braking that will control the amount of current drawn by the one or more motors 402 of the one or more drive units 112 or generated by the one or more motors 402 when performing regenerative breaking.

For example, the attributes may include an accelerator response. The accelerator response defines the desired acceleration (positive or negative), change in torque output by one or more motors, change in current supplied to one or more motors, or some other metric. The accelerator response may be a function of a position, or change in position, of an accelerator pedal of the vehicle 100. The accelerator response may be a function of the current velocity of the vehicle. The accelerator response may include a discrete set of accelerator responses, such as an accelerator response for each drive mode.

The attributes may include a regenerative braking behavior. The regenerative braking behavior defines an amount of power generation to be performed in response to releasing of the accelerator pedal, depressing of the brake pedal, or other event. The regenerative braking behavior may be a function of the velocity of the vehicle 100. The regenerative braking behavior may include a discrete set of regenerative braking behaviors, such as a regenerative braking behavior for each drive mode.

The dynamics controller 400 may be configured with a table, function, or some other mapping that relates a desired acceleration or torque at a given motor rotational speed to an amount of current required by the one or more motors 402. Similarly, a table, function, or some other mapping may define an amount of current generated from the one or more motors 402 for a given motor rotational speed and desired deceleration or regenerative braking torque.

The dynamics controller 400 may be coupled to battery manager 404 that controls the flow of current to and from the battery 110. The battery manager 404 may be implemented as the BMS ECU or by one or more of the zonal controller 206a, 206b, 206c. The battery manager 404 may control the flow of current during charging from a charging station or regenerative breaking to avoid overheating the battery 110. The battery manager 404 likewise controls the flow of current out of the battery during driving to avoid overheating or otherwise damaging the battery 110. The battery manager 404 may be configured with chemistry-dependent attributes of the battery 110, such as a table, function, or other mapping between an output current and a temperature range suitable for the output current. The battery manager 404 may be configured with a table, function, or other mapping between an input current and a temperature range suitable for the input current. The battery manager 404 may be configured with a permitted rate of change of the temperature of the battery 110.

The battery manager 404 may be coupled to thermal controls 406 that controls one or more pumps 406a that pump fluid through the battery 110 as well as through a radiator for cooling the fluid. The TMM ECU further controls pumping of the fluid, such as propylene glycol, through a fluid heater 406b powered by the battery 110 and controls the amount of current supplied to the fluid heater 406b. The thermal controls 406 may receive outputs of one or more temperature sensors 205 incorporated into the battery 110 and/or sensing the temperature of the fluid in order to control the temperature of the battery 110 and possibly the rate of change of the temperature of the battery 110.

In some embodiments, the scheduler 414, dynamics controller 400, battery manager 404, and thermal controls 406 are all separate entities from one another in the sense that each entity is some or all of (a) a separate software module that can be started and operated independently, (b) a separate electronic component implemented on a separate chip, (c) a separate electronic component implemented on a separate circuit board, and (d) a separate electronic component housed in a different housing at a different location on the vehicle 100 relative to the other entities. For example, the battery manager 404 and thermal controls 406 may reside in or on a housing of the battery 110.

The control system 206 may be coupled to other temperature-related components of the vehicle 100, such as a heating ventilating and air-conditioning (HVAC) system 408, seat heaters 410, and a steering wheel heater 412. The control system 206 may invoke some or all of the HVAC system 408, seat heaters 410, and steering wheel heater 412 in order to prepare the temperature of the cabin, seats, and steering wheel for driving.

A scheduler 414 is coupled to or incorporated into the control system 206. The scheduler is configured with a schedule indicating the times at which the vehicle 100 should be ready for driving in terms of battery conditioning and/or the temperature of the cabin, seats, and/or steering wheel. For example, the schedule may specify one or more times each weekday at which the vehicle 100 should be ready for driving to and from work. The schedule may include individually scheduled times (i.e., date and time of day) at which a user anticipates driving the vehicle.

The scheduler 414 may instruct the controller to prepare the vehicle for driving in advance of a scheduled time. The instruction may precede the scheduled time by a conditioning delay. The conditioning delay may be a predetermined value that is selected to be larger than or equal to the amount of time required to condition the battery. The conditioning delay may be a single predefined value selected as providing sufficient time to condition the battery under most weather conditions.

The scheduler 414 may be either (a) a separate component from the control system 206 or (b) a component of the control system 206 that continues to function while other components of the control system 206 are turned off, in a sleep mode, in a standby mode, or otherwise in zero or low power consumption state as compared to when the vehicle 100 is being driven. In particular, the dynamics controller 400, battery manager 404, and thermal controls 406 may be turned off, in a sleep mode, or otherwise in a lower power consumption state until invoked by the scheduler 414. The scheduler 414 may advantageously only invoke activation of the dynamics controller 400, battery manager 404, and thermal controls 406 to condition the battery 110 without requiring the activation of other components of the control system 206 or of the vehicle 100 to reduce power consumption during the conditioning delay.

The scheduler 414 may receive a schedule through an interface displayed on the infotainment display device 304. Inputs defining time of day and dates at which conditioning of the battery 110 is to occur may be received through inputs to the infotainment display device 304 functioning as a touchscreen, the driver controls 306, voice commands, or other input modality.

Alternatively, a user may define the days of the week and time of day of the schedule using an application executing on a separate device, such as a smart phone, tablet computer, or other computing device. The schedule may be received by the control system 206 over a wireless connection, such as a BLUETOOTH connection or a connection according to some other wireless or wired protocol.

A user may schedule an individual (non-repeating) time at which conditioning of the battery is to occur using the interface displayed on the infotainment display device 304 or using the application on the separate device. Likewise, a user may invoke the immediate and unscheduled conditioning of the battery 110 through the interface on the infotainment display device 304 or the application executing on the separate device.

FIG. 5 illustrates a method 500 that may be executed by the control system 206 and scheduler 414, which may be a separate entity from the control system 206. The method 500 may be performed while the vehicle 100 is some or all of stationary, turned off other than components performing the method 500, and unoccupied. The method 500 includes evaluating, at step 502, by the scheduler 414, a schedule. The schedule may be input by a user and specify one or more scheduled times at which the vehicle 100 is to be ready for driving.

The method 500 includes determining, at step 504, by the scheduler 414, whether the schedule indicates that conditioning is due to begin. In some embodiments, the schedule accounts for a fixed conditioning delay: the scheduled time at which conditioning is due to start is obtained by subtracting the fixed conditioning delay from the time specified by the user. The fixed conditioning delay may be the amount of time required to condition the battery when at the minimum manufacturer-recommended operating temperature (e.g., −40 degrees Celsius) or some other temperature. In some embodiments, the fixed conditioning delay may be set equal to the time required to condition the battery when at the minimum temperature detected the last time the vehicle was turned on, a predicted ambient temperature from weather data for the time specified by the user, or some other temperature.

In other embodiments, step 504 may include calculating the conditioning delay on an ongoing basis, e.g., as the time required to condition the battery 110 when at a currently measured ambient temperature and/or a currently measured temperature of the battery 110. Conditioning of the battery is therefore due to begin when the current time precedes the scheduled time by the calculated conditioning delay. In some embodiments, calculation of the conditioning delay begins at some time interval preceding the time specified by the user in the schedule. For example, the time interval may be selected to be the time required to condition the battery when at the minimum manufacturer-recommended operating temperature (e.g., −40 degrees Celsius), or some other temperature. The time interval may be calculated as the time required to condition the battery based on the lowest temperature ambient sensed using the ambient temperature sensor 205 the last time the vehicle 100 was driven or a predicted ambient temperature according to a weather forecast.

The conditioning delay may be calculated as a function of ambient temperature, e.g., increase with a decrease in a current ambient temperature. The conditioning delay may also be calculated based on data received from the battery manager 404 and/or thermal controls 406. For example, the conditioning delay may be a function of some or all of a current ambient temperature, a current temperature of the battery, a temperature to which the battery 110 should be heated, a permissible rate of change in temperature of the battery 110, the maximum output (e.g., British thermal units (BTU)) of the fluid heater coupled to the thermal controls 406, and the mass of the battery 110.

If the condition of step 504 is found to be met according to any of the approaches described above, or if the user is found, at step 506, to have invoked immediate conditioning of the battery 110, subsequent steps of the method 500 may be performed.

For example, the scheduler 414 may instruct a first electronic component, such as the dynamics controller 400, to output, at step 508, a current requirement (e.g., peak and/or average current in Amperes) for the current drive mode of the vehicle 100. The dynamics controller 400 may transmit the current requirement to a second electronic component, such as the battery manager 404. The battery manager 404 may then determine, at step 510, a temperature requirement of the battery 110 suitable for producing the current indicated in the current requirement. The temperature requirement may be in the form of a minimum temperature or a range of acceptable temperatures. The battery manager 404 may then transmit the temperature requirement to a third electronic component, such as the thermal controls 406. The temperature requirement may specify a maximum rate at which the temperature may increase, a maximum fluid temperature of fluid that is allowed to circulate through the battery 110, or other requirements.

At step 512, the thermal controls 406, conditions the battery according to the temperature requirement. Step 512 may include activating the one or more pumps 406a, the fluid heater 406b, or other components of a thermal management system (TMS) to draw power from the battery 110 in order to heat the battery according to the temperature requirement. The thermal controls 406 may control the rate of heating to stay below the maximum rate of temperature increase and may ensure that the fluid that circulates through the battery 110 remains below a maximum temperature specified in the temperature requirement.

Note that other sources of heat may be present and used to heat the fluid at step 512. For example, one or more electronic components that are cooled by the fluid may be turned on for the purpose of generating heat while being otherwise unused, such as the power electronics 114 of one or both drive units 112. A motor of a drive unit 112 that may be decoupled from the wheels of the vehicle may be driven inefficiently to generate heat that is transferred to the fluid.

Following execution of the method 500, the battery is at a temperature suitable for driving according to the current drive mode of the vehicle 100. Remaining components of the control system 206 or other components of the vehicle 100 that are not involved in performing the method 500 may be activated by the control system 206 following execution of the method 500, such as following detection of a key or starting of the vehicle 100 by a user. Following starting of the vehicle, the dynamics controller 400 will control operation of the motors 402 to drive the vehicle according to inputs from the driver, e.g., accelerator pedal position. The battery manager 404 will control supply of current to the motors as requested by the dynamics controller 400. The thermal controls 406 will monitor the temperature of the batteries due to supplying current or receiving current from regenerative braking and activate the one or more pumps 406a to keep the temperature within a desired range of temperatures.

Figure 6:
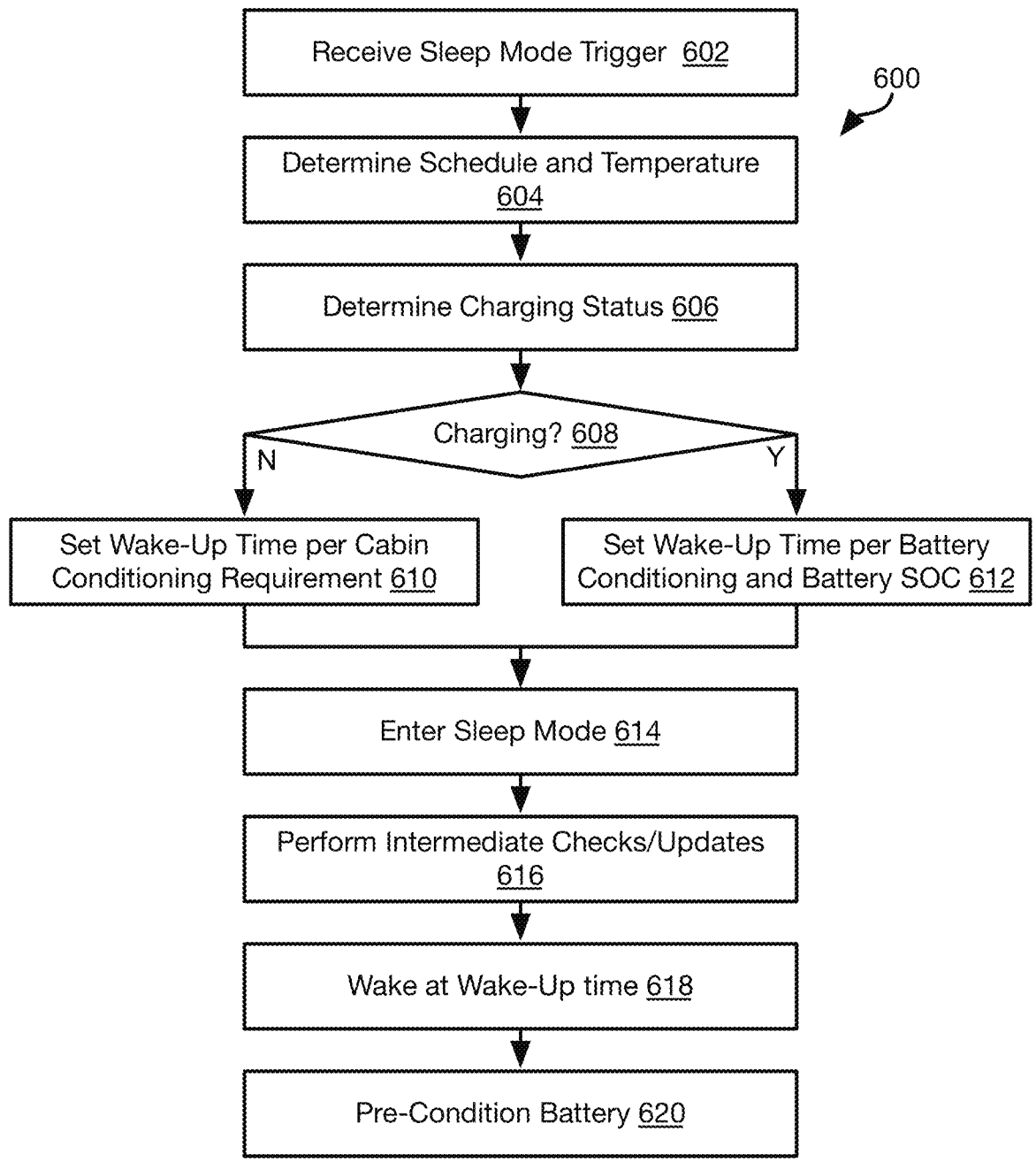
FIG. 6 illustrates a method for scheduling conditioning of a battery in accordance with certain embodiments.

FIG. 6 illustrates a method 600 for scheduling conditioning of the battery 110. The method 600 may be executed by the control system 206 or another component of the vehicle 100. The method 600 may include receiving, at step 602, a trigger invoking entry of the vehicle 100 to a sleep mode. The trigger may include a user pressing a button or providing other input that instructs the vehicle 100 to enter the sleep mode. The trigger may include the vehicle not moving or receiving other inputs from a user during timeout period. The subsequent steps of the method 600 described below may be invoked in response to receiving the sleep mode trigger at step 602.

The method 600 may include determining, at step 604, a schedule and a temperature. The schedule may be user-specified ready time at which the vehicle 100 is desired to be ready to be driven. The ready time may be a fixed time every weekday or selected weekdays, a fixed time for weekend days. The ready time may be by a user for a specific day. The ready time may be determined by the scheduler 414 in response to an input from a user. The input may be received through a display device 302, 304 implemented as a touch screen, a mobile device connected to the control system 206 directly or by way of an intermediate server, or some other approach.

The temperature determined at step 604 may include an ambient temperature as measured using a temperature sensor 205 of the vehicle 100. Step 604 may include retrieving an expected ambient temperature at the ready time according to a weather report. Step 604 may further include determining a current temperature of the battery 110.

The method 600 may include evaluating, at step 606, the charging status of the battery 110. For example, step 606 may include evaluating whether the battery 110 is currently connected to a source of electrical power and the rate of charging (Amperes) of the battery 110. Step 606 may include evaluating the current state of charge (SOC) of the battery 110.

If the battery is found, at step 608, to not be charging, then a wake-up time may be determined and set for the control system 206 based on a cabin conditioning requirement, e.g., the time required to heat the air in the cabin of the vehicle 100 to a target temperature ("the cabin conditioning time"). The cabin conditioning time may be estimated based on the thermodynamic process of heating the air in the cabin to the target temperature given the current ambient temperature (or the expected ambient temperature at the ready time) and the heating or cooling capacity of the HVAC system 408 of the vehicle 100.

If the battery is found, at step 608, to be charging, then step 612 may include determining the wake-up for the control system 206 based on a time required to condition the battery to approximately an ideal temperature (e.g., within 5 degrees of an ideal temperature or within in a target range of temperatures) and setting the wake-up time as determined at step 612. The wake-up time may be set to be the ready time less a battery conditioning time, e.g., the time required to condition the battery from the current ambient temperature (or the expected ambient temperature at the ready time) to approximately the ideal temperature. In typical scenarios, the battery conditioning time is greater than the cabin conditioning time.

In some embodiments, the battery conditioning time may take into account the state of charge (SOC) of the battery 110 and the charging rate of a charger coupled to the battery 110. For example, the amount of current available to condition the battery may be reduced such that the battery 110 may continue to charge. Accordingly, the battery conditioning time may be increased. For example, the wake-up time may be selected to achieve two end states by the ready time: a full SOC of the battery 110 and the battery 110 conditioned to approximately the ideal temperature. The wake-up time may be calculated based on an SOC resulting from charging up until the wake-up time.

The control system 206 may then cause the vehicle 100 to enter a sleep mode at step 614. The sleep mode may be a mode in which all electrical components of the vehicle 100 are unpowered except for some or all of the control system 206 needed to wake-up the vehicle 100 at the wake-up time and to respond to user commands to start up the vehicle 100.

Between entering sleep mode at step 614 and the wake-up time, the method 600 may include performing, at step 616, one or more checks of the state of the vehicle 100. Step 616 may include waking up portions of the control system 206 or other components of the vehicle 100 sufficiently to evaluate some or all of ambient temperature, expected temperature at the ready time, battery temperature, battery state of charge, and current charging rate. If some or all of these values have changed, the control system 206 may recalculate the wake-up time based on the changed values as described above. After performing step 616, the control system 206 may return the vehicle 100 to sleep mode. Step 616 may be performed one or more times prior to the wake-up time determined at step 610, 612, or a previous iteration of step 616.

The control system 206 may wake the vehicle 100 at step 618 and pre-condition the battery 620, e.g., heat or cool the battery 620 to be approximately at the ideal temperature. Step 618 may be accompanied by conditioning the cabin using the HVAC system 408 to a target temperature. Step 618 may also be accompanied with continued charging of the battery in the case where the vehicle 100 is connected to a power source.

The descriptions of the various embodiments of the present disclosure have been presented for purposes of illustration. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure may exceed the specific described embodiments. Instead, any combination of the features and elements, whether related to different embodiments, is contemplated to implement and practice contemplated embodiments. Furthermore, although embodiments disclosed herein may achieve advantages over other possible solutions or over the prior art, the embodiments may achieve some advantages or no particular advantage. Thus, the aspects, features, embodiments and advantages discussed herein are merely illustrative.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a one or more computer processing devices. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Certain types of storage devices that include these mediums include: diskette, hard disk, random access memory (RAM), read only memory (ROM), erasable programmable read only memory (EPROM or Flash memory), static random access memory (SRAM), compact disc read only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, refers to non-transitory storage rather than transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but the storage device remains non-transitory during these processes because the data remains non-transitory while stored.

While the foregoing is directed to embodiments of the present disclosure, other and further embodiments may be devised without departing from the basic scope thereof, and the scope thereof is determined by the claims that follow.

What is claimed is:

1. A vehicle comprising:
a chassis;
one or more motors mounted to the chassis;
a battery mounted to the chassis; and
a control system mounted to the chassis, the control system comprising:
at least one memory comprising executable instructions; and
at least one processor in data communication with the at least one memory and configured to execute the instructions to cause the control system to:
receive a ready time at which the battery should be within a range of acceptable temperatures;
(a) evaluate, whether the battery is connected to a source of electrical power;
(b) if the battery is connected to the source of electrical power, selecting a first wake-up time at which to begin conditioning of the battery to within the range of acceptable temperatures, the first wake-up time preceding the ready time by a battery conditioning time; and
(c) if the battery is not connected to the source of electrical power, selecting a second wake-up time at which to begin conditioning of the battery to within the range of acceptable temperatures, the second wake-up time preceding the ready time by a cabin conditioning time that is less than the battery conditioning time, the cabin conditioning time being an estimated time to condition a cabin of the vehicle to a target temperature.

2. The vehicle of claim 1, wherein the control system is configured to calculate the battery conditioning time and the cabin conditioning time according to a detected ambient temperature.

3. The vehicle of claim 1, wherein the control system is configured to calculate the battery conditioning time based on a rate of charge from the source of electrical power and a state of charge of the battery.

4. The vehicle of claim 1, wherein the control system is configured to precondition the battery when the vehicle is connected to the source of electrical power while continuing to charge the battery.

5. The vehicle of claim 1, wherein the control system is configured to perform (a), (b), and (c) in response to receiving a trigger to enter a sleep state.

6. The vehicle of claim 5, wherein the control system is configured to place the vehicle in the sleep state following performing (a), (b), and (c).

7. The vehicle of claim 6, wherein the control system is configured to periodically wake following placing the vehicle in the sleep state and to repeat at least one of (a), (b), or (c).

8. The vehicle of claim 1, wherein the control system is configured to calculate the first wake-up time and the second wake-up time according to an ambient temperature.

9. The vehicle of claim 1, wherein the control system is configured to calculate the first wake-up time and the second wake-up time according to an expected temperature at the ready time.

10. The vehicle of claim 1, wherein the control system is configured to determine the ready time according to a schedule received from a user.

* * * * *